United States Patent [19]

Takahashi

[11] Patent Number: 4,945,470
[45] Date of Patent: Jul. 31, 1990

[54] HIERARCHY MULTI-PROCESSOR SYSTEM AND CONTROL METHOD THEREFOR

[75] Inventor: Hideo Takahashi, Yokohama, Japan

[73] Assignee: Hitachi. Ltd., Tokyo, Japan

[21] Appl. No.: 748,870

[22] Filed: Jun. 20, 1985

[30] Foreign Application Priority Data

Jun. 20, 1984 [JP] Japan ................................. 59-125120

[51] Int. Cl.⁵ .............................................. G06F 9/00
[52] U.S. Cl. ................................. 364/200; 364/228.1; 364/230.4; 364/230.6
[58] Field of Search ................ 364/200 MS File, 200, 364/300, 900

[56] References Cited

U.S. PATENT DOCUMENTS

| | | | |
|---|---|---|---|
| 4,073,005 | 2/1978 | Parkin | 364/200 |
| 4,123,794 | 10/1979 | Matsumoto | 364/101 |
| 4,240,143 | 12/1980 | Besemer et al. | 364/200 |
| 4,253,144 | 2/1981 | Bellamy et al. | 364/200 |
| 4,326,248 | 4/1982 | Hinai et al. | 364/200 |
| 4,412,285 | 10/1983 | Neches et al. | 364/200 |
| 4,414,624 | 11/1983 | Summer, Jr. et al. | 364/200 |
| 4,494,188 | 1/1985 | Nakane et al. | 364/200 |

OTHER PUBLICATIONS

Grasso, P. A., et al. "Operating System for a Dedicated Memory Multimicrocomputer System", IEE Proceedings, Section AAI, vol. 129, Part E, no. 5, Sep. 192, pp. 200-205.

Primary Examiner—Gareth D. Shaw
Assistant Examiner—John G. Mills
Attorney, Agent, or Firm—Antonelli, Terry, Stout & Kraus

[57] ABSTRACT

A multi-processor system has a main memory shared by a plurality of processors, two operating systems, a local supervisor for executing processing in a local area and a global supervisor for executing processing which requires access to a common area. When the local supervisor needs processing which requires access to an area other than the local area, it requests that execution of the processing be effected by the global supervisor. Thus, the local supervisor executes the processing only in the local area. More than one processor will do not simultaneously execute processing in one local area.

8 Claims, 6 Drawing Sheets

FIG. 3

| GETMAIN | AREA SIZE | AREA TYPE | RESPONSE AREA ADDRESS | OTHER OPERANDS |
|---|---|---|---|---|
| 31 | 32 | 33 | 34 | 35 |

FIG. 4

| 15 | (ASCBGCPU) 42 NUMBER OF G-CPU's | (ASCBLCPU) 43 NUMBER OF L-CPU's | (ASCBTCBS) 44 NUMBER OF READY TASKS | 45 OTHER CONTROL INFORMATION |
|---|---|---|---|---|
| 1 | | | | |
| 2 | DITTO | DITTO | DITTO | DITTO |
| 3 | DITTO | DITTO | DITTO | DITTO |
| --- | --- | --- | --- | --- |

41

HIERARCHY MULTI-PROCESSOR SYSTEM AND CONTROL METHOD THEREFOR

BACKGROUND OF THE INVENTION

1. FIELD OF THE INVENTION

The present invention relates to a multi-processor system which shares a main memory by a plurality of processors (CPU's).

2. DESCRIPTION OF THE PRIOR ART

As is well known, a computer system is equipped with an operating system (OS) to allow effective utilization of system resources and efficient operation of the computer system.

In a prior art multi-processor system in which a plurality of CPU's share one main memory, the OS offers controls necessary for the CPU's to carry out jobs. In this case, the following problems are encountered.

(1) A lock control to inhibit an access of the main memory by another CPU while one CPU accesses an area of the main memory to carry out a job is complex and maintenance of the OS is troublesome.

(2) The lock must be frequently secured and released. This leads to an increase of OS overhead.

(3) Because of lock competition, a performance improvement is not expected even if the number of CPU's is increased.

SUMMARY OF THE INVENTION

It is an object of the present invention to provide a multi-processor system and a control method therefor in which design and maintenance of an OS are very easy even if the number of CPU's increases and competition among the CPU's is minimized.

In the present invention, the OS is divided into two hierarchies, that is, a local supervisor which handles local resources and a global supervisor which handles global resources. Those supervisors are executed by separate CPU's. The CPU assigned to the local supervisor is called a local CPU, and the CPU assigned to the global supervisor is called a global CPU. Since the local supervisor need not consider the presence of other CPU's, the security and release of a lock are not necessary and the OS can be designed and maintained as easily as an OS having no multiprocessor function. Since the competition with other CPU's is minimized by minimizing the dependency to the global supervisor (a user program and the local supervisor are operated without any interference from other CPU's), the system performance is improved in proportion to the number of local CPU's.

BRIEF DESCRIPTION OF THE DRAWINGS

FIG. 3 shows a format of a GETMAIN instruction, FIG. 4 shows a control block.

DESCRIPTION OF THE PREFERRED EMBODIMENTS

Figure 1:
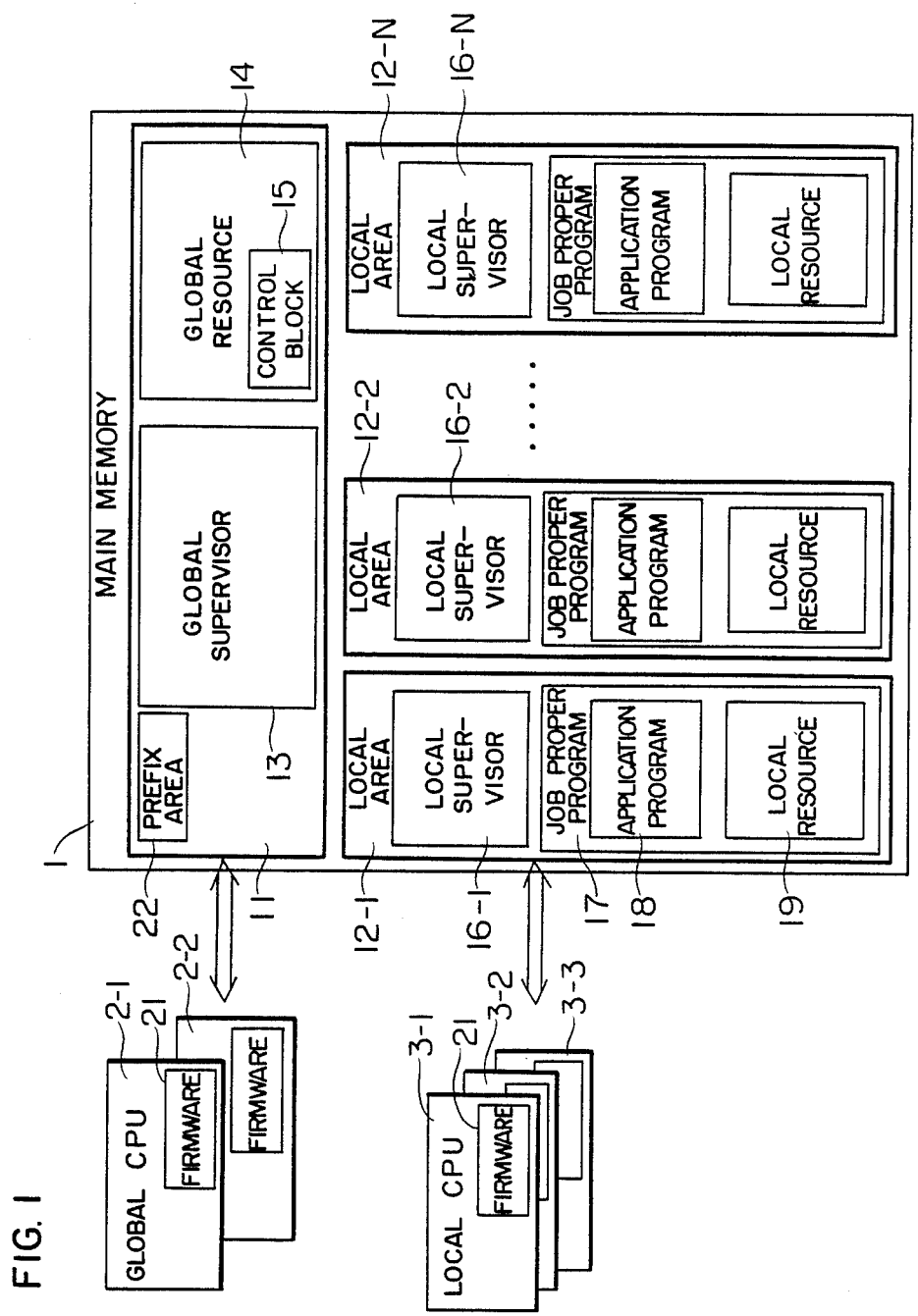
FIG. 1 shows an overall configuration of one embodiment of the present invention.

FIG. 1 shows the overall configuration of one embodiment of the present invention. A main memory 1 is shared by CPU's 2-1, 2-2, 3-1, 3-2 and 3-3. The main memory 1 has local areas 12-1–12-N each of which is used only during the processing by one designated CPU and a common area 11 which is commonly used by the processing of local areas. The local areas 12 each contain a local supervisor 16. The local area 12 further contains a job proper area 17 which includes a local resource 19 and an application program 18. A job in the computer system is carried out by executing the application program 18 under control of the local supervisor 16 and the global supervisor 13. Each of the local CPU's is used for processing in one local area, and the processing in one local area is not simultaneously carried out by a plurality of CPU's 2 and 3. For example, the local CPU 3-1 carries out the processing of the local area 12-1, the local CPU 3-2 carries out the processing of the local area 12-2, and the local CPU 3-3 carries out the processing of the local area 12-3. The processing of other local areas is not carried out during this period. The processing of other local areas is carried out when one of the local CPU's 3 completes or interrupts the processing of the local area and is allowed to carry out the processing of another local area. The processings by the local CPU's 3 are carried out independently from the others. The local supervisor 16 is as simple as a system having a single CPU and can fully utilize the performance of the CPU's.

In order to execute the application program 18, not only the processing in one local area, but also the processing which utilizes a global resource to be commonly used by all local areas, may be carried out. When such processing is required, the local supervisor 16 requests such execution by the global supervisor 13. The global supervisor 13 is executed by the two global CPU's 2-1 and 2-2. It may be executed by one CPU or any number of CPU's. The result of processing by the global supervisor 13 is returned to the local area of the requesting local supervisor. In order to prevent competition between the processing by the global supervisor and the processing by the local supervisor, while the global supervisor 13 is carrying out the processing, the processing of the local supervisor 16 in the local area related to the processing by the global supervisor 13 is inhibited.

In the present embodiment, the global CPU 2 and the local CPU 3 are identical in construction except that they access different areas of the main memory.

Referring to FIGS. 2 to 8, the embodiment of the present invention is explained in detail.

Let us assume that an instruction GETMAIN which requests allocation of a working area in the main memory is issued during the execution of the application program 18 in the local area 12-1 by the local CPU 3-1. An interruption referred to as a supervisor call (SVC) is issued to the local supervisor 16-1 and the processing of the local supervisor 16-1 is carried out.

The instruction GETMAIN has an instruction format shown in FIG. 3. Numeral 31 denotes an operation code and numerals 32–35 denote operand fields. The field 32 contains the size of an area required, the field 33 contains the type of the area, the field 34 contains an address of a response area in which a result of area allocation is to be stored, and the field 35 contains other operands. The type of area is designated by one of 256 numerals 0–255 each having a different meaning from the others. 0–127 designates the areas in the global resource 14, and 128–255 designate the areas in the local resource 19. The local supervisor 16-1 checks the type of area field 33 to determine whether allocation of the local area is requested or not (101). If the decision is YES, it assigns the area of the local resource 19 on request (102). The control is returned to the application program 18. If the decision is NO in the step 101, the local supervisor 16-1 requests execution by the global supervisor 13 (111). This is called a global supervisor call.

The execution of the processing in the local area 12-1 by the local CPU 3-1 is interrupted and the processing in another local area is executed by the local CPU 3-1.

A control block 15 used for the above processing is first explained. It is in the global resource 14 and is formated as shown in FIG. 4. It contains various control information for each local area. A column 41 shows local area numbers, a column 42 shows the number of global CPU's (ASCBGCPU) which are executing a processing on the local area, a column 43 shows the number of local CPU's (ASCBLCPU) which are executing the processing on the local area, a column 44 shows the number of tasks (ASCBTCBS) which can be executed in the local area, and a column 45 shows other control information.

The local supervisor 16-1 requests to the firmware 21 of the local CPU 3-1 which executes, the processing on the local area to search for another local area which has a ready task and which is not under execution (112). The firmware 21 carries out the processing shown in FIG. 6 under microprogram control. First, it checks to see if the column 42 (ASCBGCPU) and the column 43 (ASCBLCPU) for the first local area of the control block 15 are "0" (301). If they are "0", it checks to see if the column 44 (ASCBTCBS) is larger than "0" (302). If it is larger, the current local area number is identified to the local supervisor (303). If the decision in any of the steps 301 and 302 is NO, whether the last local area of the control block 15 has been examined or not is checked (304), and if it has not, the next local area is examined (305), and the steps 301 and 302 are repeated. If the decision in the step (304) is YES, the absence of an area corresponding to the local supervisor is indicated (306).

The local supervisor 16-1 detects the response from the firmware 21 to determine whether or not the corresponding local area is present (113). If it is, it requests to the firmware 21 together with the local area number to carry out the control to shift the processing to the local area (114). The firmware 21 responds thereto to carry out the processing shown in FIG. 7. It first checks whether or not the column 42 (ASCBGCPU) of the local area is "0" (401) and whether or not the column 43 (ASCBLCPU) is "0". If any of the decisions is NO, it indicates CC≠0 to the local supervisor (405). If the decisions in the steps 401 and 402 are both "0", "1" is set in the column 43 (ASCBLCPU) of the local area (403) and CC=0 is indicated to the local supervisor (404). The local supervisor checks to see if CC=0 (115), and if it is, it requests to the firmware to release the CPU from the current local area and switches the local area (116). The switching of the space processed by the CPU is disclosed in U.S. Pat. No. 4,326,248. A content of a register called a segment table origin is changed to a new address area so that the processing for the new address area is executed.

Figure 8:
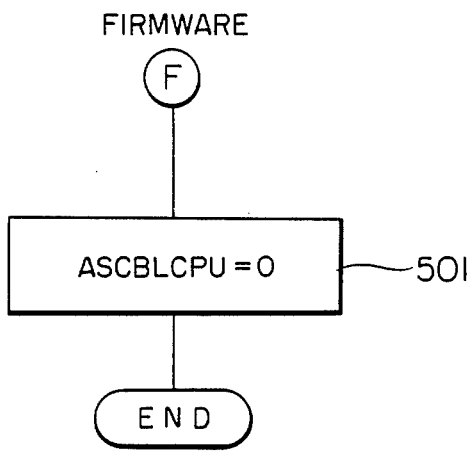

The firmware 21 sets the column 43 (ASCBLCPU) of the local area to "0" as shown in FIG. 8 (501). If the decisions in the steps 113 and 115 are NO, the step 112 is executed.

Figure 2:
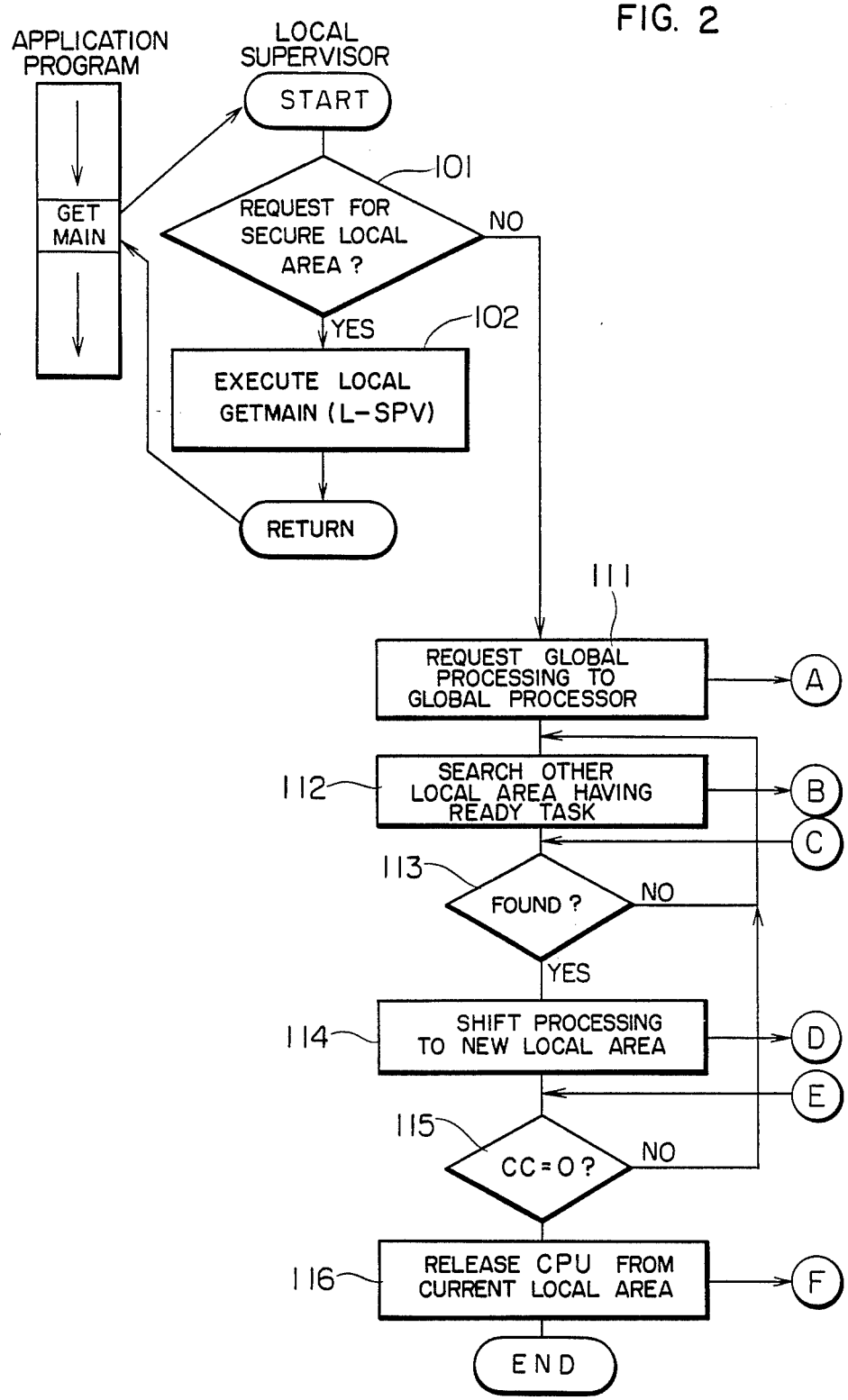
FIG. 2 is a flow chart illustrating control by a local supervisor.

The processing for the step 111 of FIG. 2 is now explained. When the global supervisor call is made, the contents of the program status word (PSW), control registers (including the segment table origin) and general purpose registers are stored in the prefix area of the CPU which starts the new processing, as also done in the conventional supervisor call. In the present embodiment, because there are a plurality of global CPU's, those register contents are stored in the prefix area are used by the global CPU which responds to the step 111 to execute the processing. A non-busy global CPU is selected. If no non-busy global CPU is available, the sequence is queued.

Figure 5:
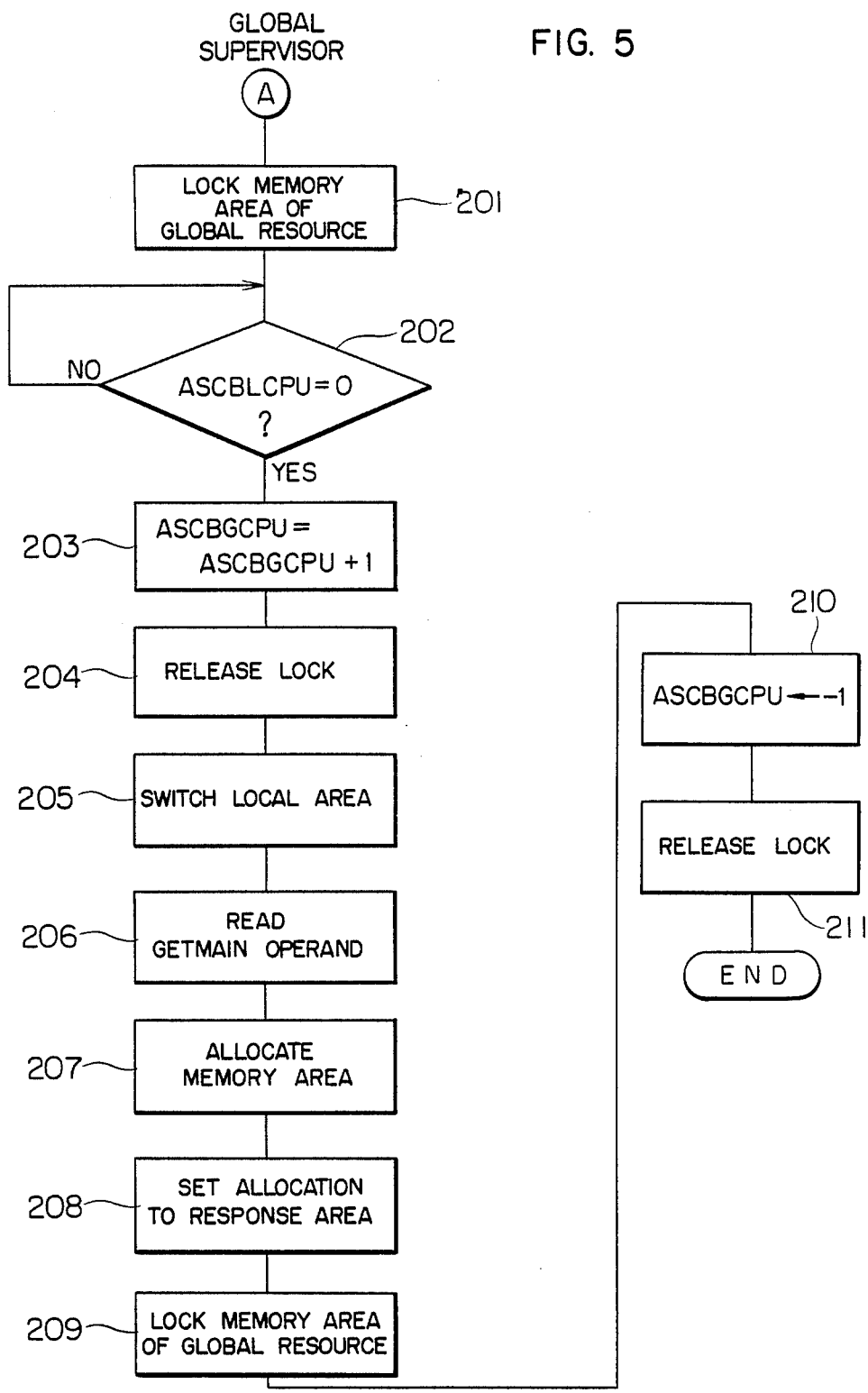
FIG. 5 is a flow chart illustrating control by a global supervisor.
Figure 6:
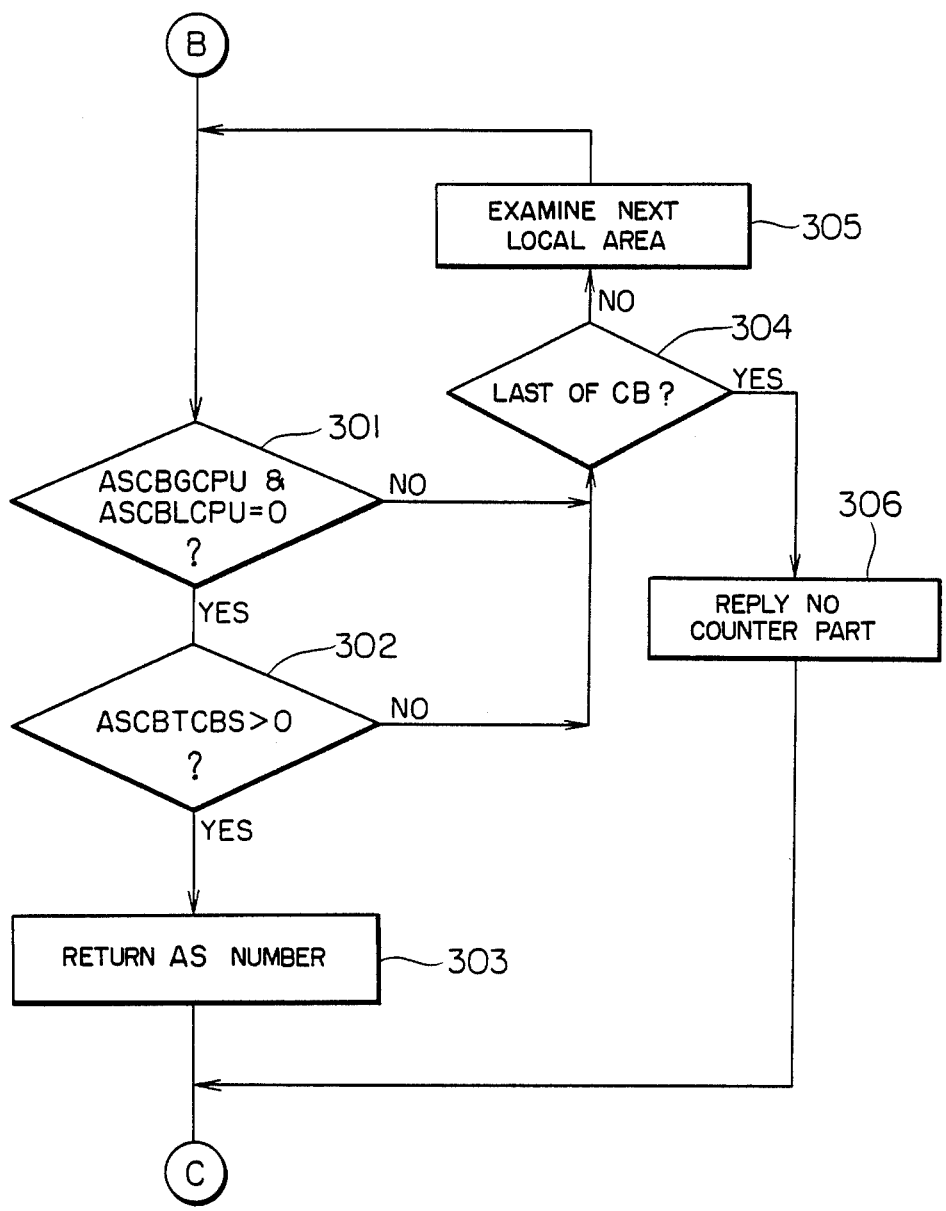
FIGS. 6, 7 and 8 show examples of firmware control.
Figure 7:
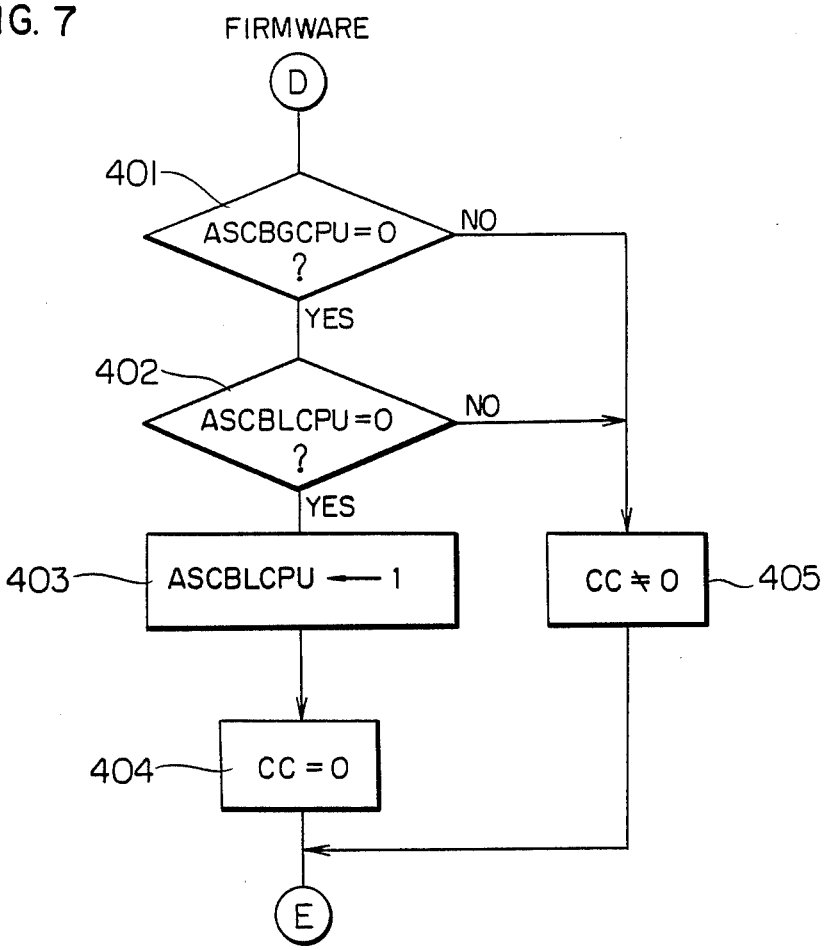

When the global supervisor 13 receives the global supervisor call, it carries out the processing shown in FIG. 5. It locks the memory area of the global resource to prevent it from being used by other processing (201). In order to check to see if the local CPU for that processing has been released from the local area, the global supervisor 13 checks to see if the ASCBLCPU column 43 of the local area of the control block 15 is "0" (202). If it is not "0", the above step is repeated. If it is "0", the ASCBGCPU column 42 of the local area is incremented by one (203). Then, the lock is released (204). Then, it accesses the local area 12-1 by the information written in the prefix area 22 (205) and reads the issued GETMAIN operand (206). It assigns the memory area in accordance with the information (207). It sets the assignment to the address location in the local resource 19 designated by the response area address 34 in the operand (208). Then, it locks the memory area as it did in the step 201 (209), and decrements the ASCBGCPU column 42 of the local area of the control block 15 by one (210). Then, it releases the lock (211).

In this manner, when the processing requested by the instruction issued by the application program of the local area 12-1 relates to an area other than the local area 12-1, it is executed not by the local supervisor 16-1 but by the global supervisor 13, and the result of the processing is presented to the local supervisor 16-1.

The processing by the local supervisor 16-1 is resumed when the local CPU which does not process any local area carries out the steps 112 to 116 of FIG. 2.

In an alternative embodiment, the local areas are imparted with priorities, and if a ready task is present in the local area having a higher priority than the local area currently being processed by the local CPU, the current processing is interrupted and the ready task is processed.

In this manner, the local supervisor can proceed with the processing independently from other processing.

What is claimed is:

1. A multi-processor system comprising:
   a main memory having a common area occupying an address space, and a plurality of local areas each occupying respective address spaces in which there are respective application programs for jobs to be executed independently from each other;
   a plurality of local supervisors each provided in the address space of a respective one of said local areas and each being capable of executing similar operating system processes;
   a global supervisor provided in the address space of said common area, said common area also containing a global resource utilized in common by said local supervisors via said global supervisor, and each local area containing a local resource utilized by the one of said local supervisors therein; and a plurality of processors sharing said main memory for executing processing under control of said local supervisors or said global supervisor;

each of said local supervisors having means for requesting the execution of processing by said global supervisor when it requires access to a global resource in said common area in the course of processing;

said global supervisor having means for executing a processing when it receives a request from a local supervisor for such processing.

2. A multi-processor system according to claim 1, wherein an application program is stored in each local area, which application program is executed under control of said local supervisor and issues a request for processing to said local supervisor; and said local supervisor has means responsive to a request for processing from said application program for executing the processing if the processing can be executed in the local area for which the local supervisor is provided, and for requesting the execution of the processing by said global supervisor if the processing cannot be executed in the local area.

3. A multi-processor system according to claim 1, wherein said processors are provided in groups and each of a plurality of groups of said processors executes processing in a respective local area and another group of processors executes processing which requires access to said common area.

4. A multi-processor system according to claim 1, wherein only one of said processors operates at one time under control of said local supervisor.

5. A multi-processor system according to claim 2, wherein a local supervisor, after it requests execution of a processing, causes the processor which executes the processing under control of the local supervisor to execute the processing by another local supervisor.

6. A multi-processor system according to claim 5, wherein a control block is provided in said common area for storing therein information on whether a processor is executing a processing for a local area, whether a processor is executing a processing using a local supervisor in the local area, and whether the processing to be executed is present in the local area or not, and said other local supervisor is one of said local supervisors of a local area for which information stored in said control block has shown that there is no processor executing the processing for the local area, that there is no processor executing the processing by the local supervisor in the local area, and that there is a processing to be executed in the local area.

7. A multi-processor system having a main memory shared by a plurality of processors, comprising:

a main memory having a common area occupying an address space in which there is provided a global supervisor and a plurality of local areas each occupying respective address spaces in which there are respective application programs for jobs to be executed independently from each other;

a plurality of local processors each executing only processing in a respective one of said local areas; and a global processor for executing only processing which requires access to said common area.

8. A method for controlling a multi-processor system including a main memory having a common area occupying an address space and a plurality of local areas each occupying respective address spaces in which there are respective application programs for jobs to be executed independently from each other, a plurality of local supervisors each provided for a respective one of said local areas and each being capable of executing similar operating system processes, a global supervisor provided for said common area, a plurality of processors sharing said main memory for executing processing by said local supervisors or said global supervisor and application programs provided one for each of said local areas, said method comprising the steps of:

executing an application program;

determining, when said application program requests processing by a local supervisor, whether said processing can be executed in one of said local areas;

executing the processing by the local supervisor if the processing is executable in the local area; and requesting execution of the processing by said global supervisor if the processing is not executable in the local area.

* * * * *